United States Patent
Lin et al.

(10) Patent No.: US 10,069,666 B2
(45) Date of Patent: Sep. 4, 2018

(54) TRANSCEIVER ARCHITECTURE THAT MAINTAINS LEGACY TIMING BY INSERTING AND REMOVING CYCLIC PREFIX AT LEGACY SAMPLING RATE

(71) Applicant: Telefonaktiebolaget LM Ericsson (publ), Stockholm (SE)

(72) Inventors: Xingqin Lin, San Jose, CA (US); Asbjörn Grövlen, Stockholm (SE); Niklas Johansson, Uppsala (SE); Yi-Pin Eric Wang, Fremont, CA (US); Christian Hoymann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/736,258

(22) PCT Filed: Jul. 12, 2016

(86) PCT No.: PCT/IB2016/054160
§ 371 (c)(1),
(2) Date: Dec. 13, 2017

(87) PCT Pub. No.: WO2017/013533
PCT Pub. Date: Jan. 26, 2017

(65) Prior Publication Data
US 2018/0176061 A1 Jun. 21, 2018

Related U.S. Application Data

(60) Provisional application No. 62/194,772, filed on Jul. 20, 2015.

(51) Int. Cl.
*H04B 15/00* (2006.01)
*H04L 27/26* (2006.01)
(Continued)

(52) U.S. Cl.
CPC ........... *H04L 27/2647* (2013.01); *H04B 1/10* (2013.01); *H04B 7/04* (2013.01); *H04L 25/02* (2013.01);
(Continued)

(58) Field of Classification Search
CPC ....... H04B 3/32; H04B 3/23; H04L 25/03343; H04L 25/497; H04L 25/03057;
(Continued)

(56) References Cited

U.S. PATENT DOCUMENTS 6,208,671 B1 * 3/2001 Paulos ............... H03H 17/0628
341/61
6,973,144 B1 * 12/2005 Zhu ...................... H04L 25/0234
375/350

(Continued)

OTHER PUBLICATIONS

Huawei Technologies Co., Ltd., et al., "GP-140563: NB M2M—Overview of the Physical Layer Design," Third Generation Partnership Project (3GPP) TSG GERAN #63, Aug. 25-29, 2014, 12 pages, Ljubljana, Slovenia.
(Continued)

*Primary Examiner* — James M Perez
(74) *Attorney, Agent, or Firm* — Withrow & Terranova, PLLC

(57) ABSTRACT

Systems and methods relating to a transceiver architecture that maintains legacy timing by inserting and removing a cyclic prefix at a legacy sampling rate are disclosed. In some embodiments, a system for a receiver comprises an upsampling subsystem, a cyclic prefix removal unit, and a downsampling subsystem. The upsampling subsystem is operable to process a first baseband receive signal that is at a first sampling rate to generate an upsampled baseband receive signal at a second sampling rate that is greater than the first sampling rate. The cyclic prefix removal unit is operable to remove a cyclic prefix from the upsampled baseband receive
(Continued)

signal to provide a second baseband receive signal at the second sampling rate. The downsampling subsystem is operable to process the second baseband receive signal to generate a downsampled baseband receive signal at the first sampling rate. In this manner, complexity and power consumption are reduced.

48 Claims, 8 Drawing Sheets

(51) Int. Cl.
  *H04B 7/04*    (2017.01)
  *H04L 25/02*   (2006.01)
  *H04B 1/10*   (2006.01)

(52) U.S. Cl.
  CPC ...... *H04L 27/2607* (2013.01); *H04L 27/2626* (2013.01)

(58) Field of Classification Search
  CPC . H04L 27/368; H04L 7/0062; H04L 25/0204; H04L 7/0337; H04L 7/0334; H04L 7/033; H04L 7/0029; H04L 27/2647; H04L 2025/03414; H03F 1/3247; H03F 1/3294; H03F 2201/3233; H03L 7/091
  USPC ................. 375/259–285, 295–352, 354–355
  See application file for complete search history.

(56) References Cited

U.S. PATENT DOCUMENTS

| | | | | |
|---|---|---|---|---|
| 7,257,128 B2* | 8/2007 | Mestdagh | ............... | H04B 3/542 370/419 |
| 7,295,626 B2* | 11/2007 | Chayat | ................... | H04L 5/023 375/260 |
| 7,340,224 B2* | 3/2008 | Marsili | ............... | H04B 1/0475 375/296 |
| 7,463,678 B2* | 12/2008 | Ginesi | ............... | H04L 25/03012 375/231 |
| 7,680,210 B2* | 3/2010 | Bode | .................. | H04L 27/0008 375/297 |
| 7,751,509 B1* | 7/2010 | Lehnert | ................ | H04B 1/7105 375/260 |
| 7,778,347 B2* | 8/2010 | Chen | ................... | H04L 27/2623 375/254 |
| 7,778,363 B2* | 8/2010 | Inagawa | ............... | H04L 7/0058 370/509 |
| 7,948,868 B2* | 5/2011 | Sahlman | .............. | H04L 5/0007 370/210 |
| 7,991,091 B2* | 8/2011 | Suzuki | ............... | H04L 27/2605 370/203 |
| 8,045,635 B2* | 10/2011 | Ko | ....................... | H04L 27/2602 341/94 |
| 8,249,129 B2* | 8/2012 | Fudge | ................. | H04B 1/7136 341/152 |
| 8,401,095 B2* | 3/2013 | Han | ................... | H04L 27/2636 375/259 |
| 8,406,323 B2* | 3/2013 | Huang | ................. | H04L 27/265 375/260 |
| 8,411,661 B2* | 4/2013 | Lipka | .................. | H04L 5/0007 370/344 |
| 8,498,350 B2* | 7/2013 | Stern | .................. | H04L 27/2613 370/203 |
| 8,599,945 B2* | 12/2013 | Sampath | ............. | H04B 7/0417 375/260 |
| 8,711,903 B2* | 4/2014 | Rheinfelder | ............ | H04B 1/18 375/219 |
| 8,743,837 B2* | 6/2014 | van Zelst | ............ | H04L 5/023 370/206 |
| 8,787,873 B1* | 7/2014 | Hitt | ........................ | H04W 8/20 455/406 |
| 8,947,993 B2* | 2/2015 | Park | .................... | H04L 27/2627 370/203 |
| 9,001,918 B2* | 4/2015 | Taori | ................... | H04L 27/2626 375/137 |
| 9,037,093 B2* | 5/2015 | Smith | ................ | H04B 7/18534 375/260 |
| 9,313,063 B1* | 4/2016 | Jia | ........................ | H04L 27/2605 |
| 9,325,554 B2* | 4/2016 | Yokokawa | .......... | H04L 25/0232 |
| 9,369,325 B2* | 6/2016 | Kim | ..................... | H04L 27/2627 |
| 9,800,445 B2* | 10/2017 | Hasegawa | ............... | H04L 27/36 |
| 9,813,276 B2* | 11/2017 | Jungnickel | ........ | H04L 25/03828 |
| 9,848,342 B1* | 12/2017 | McCallister | .......... | H04W 24/02 |
| 9,853,851 B2* | 12/2017 | Simon | ................ | H04L 5/0007 |
| 9,893,924 B2* | 2/2018 | Smail | .................... | H04L 27/265 |
| 9,917,716 B2* | 3/2018 | Hasegawa | ........... | H04L 27/2636 |
| 9,942,011 B2* | 4/2018 | Tang | ........................ | H04L 5/001 |
| 9,948,436 B2* | 4/2018 | Atungsiri | .............. | H04L 5/0007 |
| 9,954,633 B2* | 4/2018 | Pralea | .................. | H04B 1/707 |
| 2003/0123383 A1* | 7/2003 | Korobkov | ............. | H04L 5/0037 370/208 |
| 2003/0202460 A1* | 10/2003 | Jung | .................... | H04L 27/2621 370/208 |
| 2004/0004936 A1* | 1/2004 | Ginesi | ............... | H04L 25/03012 370/210 |
| 2004/0021595 A1* | 2/2004 | Erdogan | ............ | H03H 17/0288 341/144 |
| 2004/0028148 A1* | 2/2004 | Dowling | ........... | H04L 25/03343 375/296 |
| 2004/0081131 A1* | 4/2004 | Walton | ................. | H04B 7/0421 370/344 |
| 2006/0014500 A1* | 1/2006 | Marsili | ................ | H04B 1/0475 455/115.1 |
| 2006/0087961 A1* | 4/2006 | Chang | ................ | H04L 27/2607 370/203 |
| 2006/0280257 A1* | 12/2006 | Kim | ...................... | H04B 7/0619 375/267 |
| 2007/0211835 A1* | 9/2007 | Inagawa | ............... | H04L 7/0058 375/343 |
| 2007/0254592 A1* | 11/2007 | McCallister | .......... | H03F 1/0205 455/67.11 |
| 2007/0280365 A1* | 12/2007 | Seki | ..................... | H04L 5/0046 375/260 |
| 2008/0031376 A1* | 2/2008 | Ban | ..................... | H04L 27/2602 375/271 |
| 2008/0159422 A1* | 7/2008 | Chen | ..................... | H03F 1/3241 375/260 |
| 2009/0052577 A1* | 2/2009 | Wang | ..................... | H04L 1/009 375/299 |
| 2009/0143884 A1* | 6/2009 | Chieng | ................... | H03F 3/217 700/94 |
| 2009/0161749 A1* | 6/2009 | Nangia | ................ | H04L 5/0007 375/233 |
| 2010/0002757 A1* | 1/2010 | Birru | .................. | H04L 27/2657 375/226 |
| 2010/0046645 A1* | 2/2010 | Nerella | ............... | H04L 27/2626 375/260 |
| 2010/0046646 A1* | 2/2010 | Nerella | ............... | H04L 27/2626 375/260 |
| 2010/0046647 A1* | 2/2010 | Nerella | ............... | H04L 27/2626 375/260 |
| 2010/0046648 A1* | 2/2010 | Nerella | ............... | H04L 27/2626 375/260 |
| 2010/0098182 A1* | 4/2010 | Forck | ................... | H04L 27/2636 375/261 |
| 2011/0013714 A1* | 1/2011 | Tamaki | ............. | H04L 25/03828 375/285 |
| 2011/0182332 A1* | 7/2011 | Ericson | ................ | H04L 5/0044 375/219 |
| 2012/0057872 A1* | 3/2012 | Freda | ................... | H04L 27/2602 398/76 |
| 2012/0307743 A1* | 12/2012 | McGowan | ............ | H04L 27/265 370/329 |
| 2013/0044028 A1* | 2/2013 | Lea | ........................ | H01Q 21/24 342/359 |
| 2013/0329830 A1* | 12/2013 | Yokomakura | ........ | H04B 7/0413 375/295 |

(56) References Cited

U.S. PATENT DOCUMENTS

| | | | |
|---|---|---|---|
| 2014/0029511 A1* | 1/2014 | Park | H04L 27/2631 370/328 |
| 2014/0169501 A1* | 6/2014 | Nazarathy | H03H 17/0266 375/316 |
| 2015/0200797 A1* | 7/2015 | McCallister | H04L 27/2623 370/329 |
| 2015/0304146 A1* | 10/2015 | Yang | H04L 5/0066 370/329 |
| 2015/0349987 A1* | 12/2015 | Soriaga | H04L 25/03834 370/329 |
| 2015/0372843 A1* | 12/2015 | Bala | H04L 25/03834 375/295 |
| 2017/0033809 A1* | 2/2017 | Liu | H04B 1/04 |
| 2017/0195156 A1* | 7/2017 | Hasegawa | H04L 27/2636 |
| 2017/0214558 A1* | 7/2017 | Nazarathy | H04L 25/03891 |
| 2017/0238344 A1* | 8/2017 | McGowan | H04W 74/0833 370/329 |
| 2017/0264476 A1* | 9/2017 | Yang | H04L 5/0066 |
| 2018/0026760 A1* | 1/2018 | Li | H04L 5/005 |
| 2018/0027427 A1* | 1/2018 | McCallister | H04B 17/336 |
| 2018/0054341 A1* | 2/2018 | Jia | H04L 25/03828 |

OTHER PUBLICATIONS

Intel Corporation, "R1-156524: On Device Complexity for Nb-IoT," Third Generation Partnership Project (3GPP) TSG RAN WG1 Meeting #83, Nov. 16-20, 2015, 10 pages, Anaheim, USA.

Neul Ltd., et al., "GPC150389: NB-CIoT—Introduction," Third Generation Partnership Project (3GPP) GERAN Adhoc #3 on FS_IoT_LC, Jun. 29-Jul. 2, 2015, 5 pages.

Nokia, "LTE-M—Optimizing LTE for the Internet of Things: White Paper," XP055258450, Nokia Solutions and Networks, May 1, 2015, 16 pages.

Qualcomm Incorporated, "Tdoc GP-140839: Narrow Band OFDMA Based Proposal for GERAN Cellular IoT," Third Generation Partnership Project (3GPP) TSG GERAN #64, Nov. 17-21, 2014, 17 pages, San Francisco, USA.

VODAFONE Group Plc., "GP-140421 (rev of GP-140418 rev of GP 140411): New Study Item on Cellular System Support for Ultra Low Complexity and Low Throughput Internet of Things," Third Generation Partnership Project (3GPP) TSG-GERAN Meeting #62, May 26-30, 2014, 6 pages, Valencia, Spain.

International Search Report and Written Opinion for International Patent Application No. PCT/IB2016/054160, dated Oct. 11, 2016, 9 pages.

* cited by examiner

US 10,069,666 B2

TRANSCEIVER ARCHITECTURE THAT MAINTAINS LEGACY TIMING BY INSERTING AND REMOVING CYCLIC PREFIX AT LEGACY SAMPLING RATE

RELATED APPLICATIONS

This application is a 35 U.S.C. § 371 national phase filing of International Application No. PCT/IB2016/054160, filed Jul. 12, 2016, which claims the benefit of provisional patent application Ser. No. 62/194,772, filed Jul. 20, 2015, the disclosures of which are hereby incorporated herein by reference in theft entireties.

TECHNICAL FIELD

The present disclosure relates to a transceiver architecture.

BACKGROUND

The Internet of Things (IoT) is a vision for the future world where everything that can benefit from a connection will be connected. Cellular technologies are being developed or evolved to play an indispensable role in the IoT world, particularly with respect to Machine Type Communication (MTC). MTC is characterized by lower demands on data rates than, e.g., mobile broadband, but with higher requirements on, e.g., low-cost device design, better coverage, and the ability to operate for years on batteries without charging or replacing the batteries. To meet the IoT design objectives, the Third Generation Partnership Project (3GPP) is currently studying the evolutions of existing Second/Third/Fourth Generation (2G/3G/4G) Long Term Evolution (LTE) technologies, including the study item VODAFONE Group Plc., "GP-140421: New Study Item on Cellular System Support for Ultra Low Complexity and Low Throughput Internet of Things," 3GPP TSG-GERAN Meeting #62, May 26-30, 2014 approved in GERAN #62. The current studies under Global System for Mobile Communications (GSM) Enhanced Data Rates for GSM Evolution (EDGE) Radio Access Network (GERAN) include both GSM evolution and completely new designs. There are two main so-called "Clean Slate" solutions: (i) Narrowband (NB) M2M (Huawei Technologies Co., Ltd. et al., "GP-140563: NB M2M—Overview of the Physical Layer Design," 3GPP TSG GERAN #63, Aug. 25-29, 2014), and (ii) NB Orthogonal Frequency Division Multiple Access (OFDMA) (Qualcomm Incorporated, "GP-140839: Narrow band OFDMA based proposal for GERAN Cellular IoT," 3GPP TSG GERAN #64, Nov. 17-21, 2014). Recently, a merged solution called NB Cellular IoT (CIoT) with NB Machine to Machine (M2M) uplink and NB OFDMA downlink has been proposed and studied in GERAN (Neul Ltd et al., "GPC150389: NB-CIoT—Introduction," 3GPP GERAN Adhoc #3 on FS_IoT_LC, Jun. 29-Jul. 2, 2015). These Clean Slate solutions are NB systems with a carrier bandwidth of 200 kilohertz (kHz) and target improved coverage compared to today's GSM systems, long battery life, and low complexity communication design. One intention with these solutions is to deploy it in the spectrum that is currently used for GSM by reducing the bandwidth used by GSM and deploying NB Clean Slate systems in the spectrum that becomes available. Another intention is to reuse existing GSM sites for the deployment of NB Clean Slate systems.

3GPP has decided to move the work on specifying an NB MTC solution from GERAN to the 3GPP Technical Specification Group (TSG) Radio Access Network (RAN). A NB LTE based MTC solution is being developed to compete with other Clean Slate solutions. One prominent feature of NB LTE is in-band operation, i.e., NB LTE can be deployed within a wideband LTE subcarrier by puncturing one Physical Resource Block (PRB) in the LTE carrier and using it for NB LTE transmission. To enable this in-band operation, it is important to synthesize the NB LTE numerologies such as subcarrier spacing, Orthogonal Frequency-Division Multiplexing (OFDM) symbol interval, Cyclic Prefix (CP) duration etc., with legacy LTE to avoid mutual interference between NB LTE and legacy LTE. In particular, NB LTE is supposed to keep the same LTE time-domain structure including OFDM symbol duration and CP duration. To this end, the straightforward solution is to reuse existing LTE sampling rates (1.92 megahertz (MHz), 3.84 MHz, 7.68 MHz, 15.36 MHz, 23.04 MHz, and 30.72 MHz commonly used for 1.4 MHz, 3, 5 MHz, 10 MHz, 15 MHz, and 20 MHz LTE channel bandwidths, respectively).

SUMMARY

Systems and methods relating to a transceiver architecture that maintains legacy timing by inserting and removing a cyclic prefix at a legacy sampling rate are disclosed. In some embodiments, a system for a receiver comprises an upsampling subsystem, a Cyclic Prefix (CP) removal unit, and a downsampling subsystem. The upsampling subsystem is operable to process a first baseband receive signal that is at a first sampling rate to generate an upsampled baseband receive signal at a second sampling rate that is greater than the first sampling rate. The CP removal unit is operable to remove a cyclic prefix from the upsampled baseband receive signal to provide a second baseband receive signal at the second sampling rate. The downsampling subsystem is operable to process the second baseband receive signal to generate a downsampled baseband receive signal at the first sampling rate. In this manner, the receive signal can be processed at the lower, second sampling rate, which in turn results in lower complexity and reduced power consumption.

In some embodiments, a duration of the cyclic prefix is equivalent to a non-integer number of samples at the first sampling rate.

In some embodiments, the upsampling subsystem comprises an upsampler and a low-pass filter. The upsampler is adapted to upsample the first baseband receive signal by a factor N to thereby provide an upsampler output signal, where N is an integer greater than or equal to 2. The low-pass filter is adapted to filter the upsampler output signal with a gain of N and a cut-off of 1/N to thereby provide the upsampled baseband receive signal.

In some embodiments, the downsampling subsystem comprises a low-pass filter and a downsampler. The low-pass filter is adapted to filter the second baseband receive signal with a gain of 1 and a cut-off of 1/N to thereby provide a filter output signal. The downsampler is adapted to downsample the filter output signal by the factor N to thereby provide the downsampled baseband receive signal at the first sampling rate.

In some embodiments, the system further comprises a multi-subcarrier demodulation subsystem. The multi-subcarrier demodulation subsystem comprises a transform unit operable to perform a Fourier transform on the downsampled baseband receive signal to provide a transformed baseband receive signal. In some embodiments, the Fourier transform is a 16-point Fast Fourier Transform (FFT). In some embodiments, a subcarrier spacing between subcarriers is 15 kilohertz (kHz), the first sampling rate is 240 kHz, and the second sampling rate is 1.92 megahertz (MHz). In some embodiments, a duration of the cyclic prefix is 5.1 microseconds for a first symbol in a slot and 4.7 microseconds for remaining symbols in the slot.

In some embodiments, the receiver is a receiver for a Narrowband (NB) radio node that operates according to a narrowband technology that reuses a legacy Long Term Evolution (LTE) frame and Orthogonal Frequency Division Multiplexing (OFDM) symbol structure. In some embodiments, the narrowband technology uses a 180 kHz bandwidth.

Embodiments of a method of operation of a system for a receiver are also disclosed. In some embodiments, the method of operation of a system for a receiver comprises processing a first baseband receive signal that is at a first sampling rate to generate an upsampled baseband receive signal at a second sampling rate that is greater than the first sampling rate, removing a cyclic prefix from the upsampled baseband receive signal to provide a second baseband receive signal at the second sampling rate, and processing the second baseband receive signal to generate a downsampled baseband receive signal at the first sampling rate.

In some embodiments, a duration of the cyclic prefix is equivalent to a non-integer number of samples at the first sampling rate.

In some embodiments, processing the first baseband receive signal that is at the first sampling rate to generate the upsampled baseband receive signal at the second sampling rate comprises upsampling the first baseband receive signal by a factor N to thereby provide an upsampled signal, where N is an integer greater than or equal to 2, and low-pass filtering the upsampled signal with a gain of N and a cut-off of 1/N to thereby provide the upsampled baseband receive signal.

In some embodiments, processing the second baseband receive signal to generate the downsampled baseband receive signal at the first sampling rate comprises low-pass filtering the second baseband receive signal with a gain of 1 and a cut-off of 1/N to thereby provide a filtered signal, and downsampling the filtered signal by the factor N to thereby provide the downsampled baseband receive signal at the first sampling rate.

In some embodiments, the method further comprises demodulating the downsampled baseband receive signal, wherein demodulating the downsampled baseband receive signal comprises performing a Fourier transform on the downsampled baseband receive signal to provide a transformed baseband receive signal. In some embodiments, the Fourier transform is a 16-point FFT. In some embodiments, a subcarrier spacing between subcarriers is 15 kHz, the first sampling rate is 240 kHz, and the second sampling rate is 1.92 MHz. In some embodiments, a duration of the cyclic prefix is 5.1 microseconds for a first symbol in a slot and 4.7 microseconds for remaining symbols in the slot.

In some embodiments, the receiver is a receiver for a NB radio node that operates according to a narrowband technology that reuses a legacy LTE frame and OFDM symbol structure. In some embodiments, the narrowband technology uses a 180 kHz bandwidth.

Embodiments of a system for a transmitter are also disclosed. In some embodiments, a system for a transmitter comprises an upsampling subsystem, a CP unit, and a downsampling subsystem. The upsampling subsystem is operable to process a first baseband transmit signal that is at a first sampling rate to generate an upsampled baseband transmit signal at a second sampling rate that is greater than the first sampling rate. The CP unit is operable to add a cyclic prefix to the upsampled baseband transmit signal to provide a second baseband transmit signal at the second sampling rate. The downsampling subsystem is operable to process the second baseband transmit signal to generate a downsampled baseband transmit signal at the first sampling rate. In this manner, the transmit signal can be processed at the lower, second sampling rate, which in turn results in lower complexity and reduced power consumption.

In some embodiments, a duration of the cyclic prefix is equivalent to a non-integer number of samples at the first sampling rate.

In some embodiments, the upsampling subsystem comprises an upsampler and a low-pass filter. The upsampler is adapted to upsample the first baseband transmit signal by a factor N to thereby provide an upsampler output signal, where N is an integer greater than or equal to 2. The low-pass filter is adapted to filter the upsampler output signal with a gain of N and a cut-off of 1/N to thereby provide the upsampled baseband transmit signal.

In some embodiments, the downsampling subsystem comprises a low-pass filter and a downsampler. The low-pass filter is adapted to filter the second baseband transmit signal with a gain of 1 and a cut-off of 1/N to thereby provide a filter output signal. The downsampler is adapted to downsample the filter output signal by the factor N to thereby provide the downsampled baseband transmit signal at the first sampling rate.

In some embodiments, the system further comprises a multi-subcarrier modulation subsystem. The multi-subcarrier modulation subsystem comprises a transform unit operable to perform an inverse Fourier transform on an input signal to provide the first baseband transmit signal. In some embodiments, the inverse Fourier transform is a 16-point Inverse FFT (IFFT). In some embodiments, a subcarrier spacing between subcarriers is 15 kHz, the first sampling rate is 240 kHz, and the second sampling rate is 1.92 MHz. In some embodiments, a duration of the cyclic prefix is 5.1 microseconds for a first symbol in a slot and 4.7 microseconds for remaining symbols in the slot.

In some embodiments, the transmitter is a transmitter for a NB radio node that operates according to a narrowband technology that reuses a legacy LTE frame and OFDM symbol structure. In some embodiments, the narrowband technology uses a 180 kHz bandwidth.

Embodiments of a method of operation of a system for a transmitter are also disclosed. In some embodiments, the method of operation of a system for a transmitter comprises processing a first baseband transmit signal that is at a first sampling rate to generate an upsampled baseband transmit signal at a second sampling rate that is greater than the first sampling rate, adding a cyclic prefix to the upsampled baseband transmit signal to provide a second baseband transmit signal at the second sampling rate, and processing the second baseband transmit signal to generate a downsampled baseband transmit signal at the first sampling rate.

In some embodiments, a duration of the cyclic prefix is equivalent to a non-integer number of samples at the first sampling rate.

In some embodiments, processing the first baseband transmit signal that is at the first sampling rate to generate the upsampled baseband transmit signal at the second sampling rate comprises upsampling the first baseband transmit signal by a factor N to thereby provide an upsampled signal, where N is an integer greater than or equal to 2, and low-pass filtering the upsampled signal with a gain of N and a cut-off of 1/N to thereby provide the upsampled baseband transmit signal.

In some embodiments, processing the second baseband transmit signal to generate the downsampled baseband transmit signal at the first sampling rate comprises low-pass filtering the second baseband transmit signal with a gain of 1 and a cut-off of 1/N to thereby provide a filtered signal, and downsampling the filtered signal by the factor N to thereby provide the downsampled baseband transmit signal at the first sampling rate.

In some embodiments, the method further comprises performing an inverse Fourier transform on an input signal to provide the first baseband transmit signal. In some embodiments, the inverse Fourier transform is a 16-point IFFT. In some embodiments, a subcarrier spacing between subcarriers is 15 kHz, the first sampling rate is 240 kHz, and the second sampling rate is 1.92 MHz. In some embodiments, a duration of the cyclic prefix is 5.1 microseconds for a first symbol in a slot and 4.7 microseconds for remaining symbols in the slot.

In some embodiments, the transmitter is a transmitter for a NB radio node that operates according to a narrowband technology that reuses a legacy LTE frame and OFDM symbol structure.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
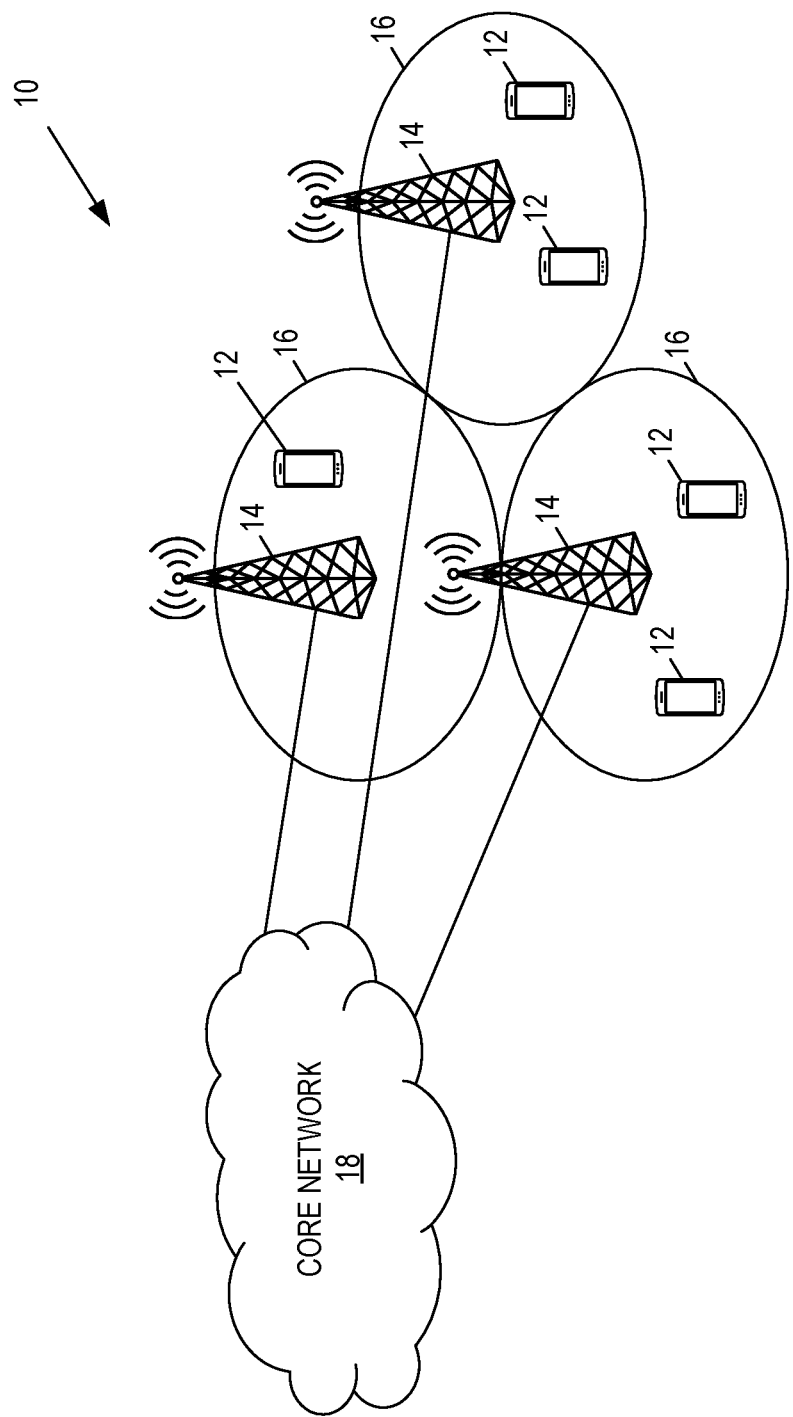
FIG. 1 illustrates one example of a communication network in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The following description presents various embodiments of the disclosed subject matter. These embodiments are presented as teaching examples and are not to be construed as limiting the scope of the disclosed subject matter. For example, certain details of the described embodiments may be modified, omitted, or augmented without departing from the scope of the described subject matter.

A significant shortcoming of existing Narrowband (NB) Long Term Evolution (LTE) solutions that reuse the legacy LTE sampling rates is that the high sampling rates can be expensive and may not be suitable for low-cost Machine Type Communication (MTC) applications. Specifically, the lowest sampling rate in LTE is 1.92 megahertz (MHz). The corresponding Fast Fourier Transform (FFT) size is 128, the normal Cyclic Prefix (CP) size of the first Orthogonal Frequency Division Multiplexing (OFDM) symbol in an LTE slot is 10 samples at 1.92 MHz, and the normal CP size of each of the remaining OFDM symbols in the LTE slot is 9 samples at 1.92 MHz. Constrained by these legacy design parameters, the sampling rate in legacy LTE cannot be below 1.92 MHz.

Using a 1.92 MHz sampling rate and a 128-point FFT in NB LTE may be expensive for low-cost MTC devices because doing so would require more powerful device processing capability. Moreover, processing radio signals at a high sampling rate consumes more device power and reduces device battery life. In NB LTE systems, devices are expected to have low-cost device design, better coverage, and an ability to operate for years on batteries without charging or replacing the batteries. Therefore, it is desirable to reduce the sampling rate while keeping the legacy LTE time-domain structure in NB LTE.

Systems and methods disclosed herein relate to transmitter and receiver architectures that are particularly well-suited to provide a backward-compatible NB LTE transceiver architecture. Certain embodiments build on existing LTE transceiver architectures but further incorporate simple, flexible timing adjustment in digital baseband processing. It should be noted that while embodiments of the present disclosure sometimes focus on NB LTE, the present disclosure is not limited thereto. The embodiments disclosed herein are more generally applicable to any technology that utilizes a narrowband carrier, which may be deployed within a NB portion of a wider, overall system bandwidth, within a guard band of a wider, overall system bandwidth, or as a standalone carrier and, in particular, any narrowband technology that maintain the legacy LTE time-domain and OFDM symbol structure.

At the device side, a transmit (and respective receive) chain only needs one additional simple up-sampling, one additional simple down-sampling, and two additional simple filtering operations to transmit (and respective receive) a downlink waveform. Though the cost of a NB LTE enhanced or evolved Node B (eNB) is of less concern, the proposed transmit and receive chains can also be used at the eNB to reduce cost if desired.

Certain embodiments enable NB LTE to operate at a much lower sampling rate and reduce FFT processing complexity, while keeping the legacy LTE time-domain structure in NB LTE.

Certain embodiments use a 240 kilohertz (kHz) sampling rate and up to 16-point FFT/Inverse FFT (IFFT), instead of the legacy 1.92 MHz LTE sampling rate and 128-point FFT/IFFT. The reduced sampling rate and FFT/IFFT complexity helps reduce MTC device cost and imposes lower requirements on device processing capability, which in turn helps save device power and increases device battery life.

Furthermore, certain embodiments enable NB LTE to use the same LTE time-domain structure and synthesize NB LTE numerologies with legacy LTE. This helps avoid mutual interference between NB LTE and legacy LTE when NB LTE is deployed within a wide LTE carrier.

Certain embodiments have the potential to reduce NB LTE MTC device costs while keeping legacy LTE time-domain structure in NB LTE.

The described embodiments may be implemented in any appropriate type of communication system supporting any suitable communication standards and using any suitable components. As one example, certain embodiments may be implemented in an LTE network, such as that illustrated in FIG. 1.

Referring to FIG. 1, a communication network 10 (which may also be referred to herein as a wireless communication network or a cellular communications network) comprises a plurality of wireless communication devices 12 (e.g., conventional User Equipment devices (UEs), MTC/Machine to Machine (M2M) UEs) and a plurality of radio access nodes 14 (e.g., eNBs or other base stations). The communication network 10 is organized into cells 16, which are connected to a core network 18 via the corresponding radio access nodes 14. The radio access nodes 14 are capable of communicating with the wireless communication devices 12 along with any additional elements suitable to support communication between wireless communication devices or between a wireless communication device and another communication device (such as a landline telephone).

NB LTE is targeting at operating on a 180 kHz channel (with possibly additional guard band). To support in-band operation, i.e., deploying NB LTE within a wideband LTE carrier, NB LTE keeps the legacy LTE numerologies. In particular, the subcarrier spacing of NB LTE is 15 kHz. Though narrower subcarrier spacing may be supported in the uplink of NB LTE, the focus in this description is on using 15 kHz subcarrier spacing in the uplink.

With normal LTE CP, the CP length of the first OFDM symbol in an LTE slot is 10 samples at a sampling rate of 1.92 MHz (i.e., 10/1.92=5.2 microseconds), and the CP length of each of the remaining OFDM symbols in an LTE slot is 9 samples at a sampling rate of 1.92 MHz (i.e., 9/1.92=4.7 microseconds). With extended LTE CP, the CP lengths of the OFDM symbols in an LTE slot are 32 samples at a sampling rate of 1.92 MHz (i.e., 32/1.92=16.67 microseconds). Due to these constraints, the lowest sampling rate that can be used in LTE is 1.92 MHz. Such a high sampling rate with the commonly used 128-point FFT/IFFT operations may not be desirable for low-cost MTC devices.

This description presents various embodiments of a backward compatible NB LTE transceiver architecture that works with 240 kHz sampling rate and 16-point FFT/IFFT. The design builds on existing commonly used LTE transceiver architecture and further incorporates novel simple, flexible timing adjustment in digital baseband processing.

Figure 2A:
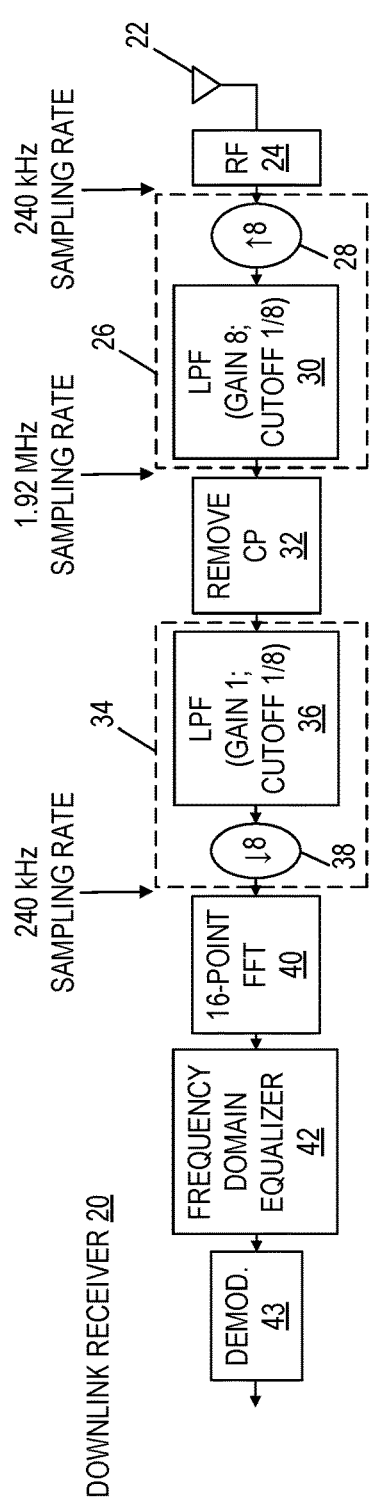
FIGS. 2A and 2B illustrate a downlink receiver and a downlink transmitter according to some embodiments of the present disclosure.
Figure 2B:
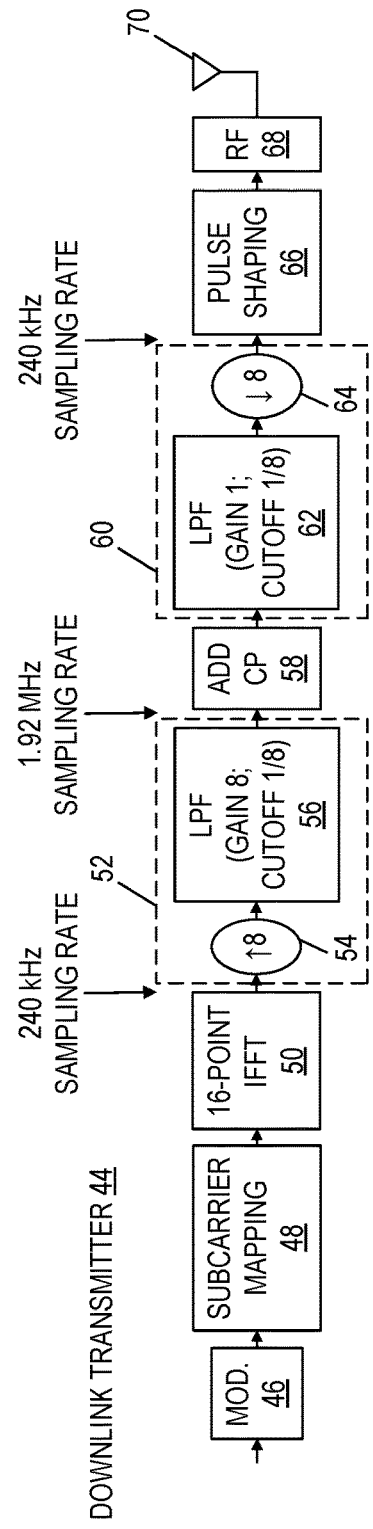

The downlink NB LTE transceiver architecture is shown in FIGS. 2A and 2B. FIG. 2A illustrates a downlink receiver 20 according to some embodiments of the present disclosure. The downlink receiver 20 is implemented in the wireless communication device 12 such as, for example, a MTC device, which is more sensitive to cost.

Receiver Front-End: The downlink receiver 20 includes a receiver front-end including an antenna 22 and a Radio Frequency (RF) component 24. The useful bandwidth of NB LTE is 180 kHz even when it is deployed within a wide LTE carrier. Therefore, in the embodiment where the desired bandwidth is 180 kHz, the RF component 24 is only required to capture a radio signal sent on a 180 kHz channel. To capture this signal without any loss, it is sufficient to have a 180 kHz sampling rate in the baseband according to Nyquist sampling theorem. Because there are 12 subcarriers, each having 15 kHz bandwidth, an FFT/IFFT size of 16 is used to facilitate FFT processing while minimizing the computational complexity as much as possible. Consequently, the baseband sampling rate is 15 kHz*16=240 kHz at the output of the RF component 24 of the downlink receiver 20. The remaining components of the downlink receiver 20 are described as follows.

Upsampling Subsystem 26: An upsampling subsystem 26 operates to upsample the baseband receive signal output by the RF component 24 from a first sampling rate (i.e., 240 kHz in this example) to a second sampling rate (i.e., 1.92 MHz in this example). The upsampling subsystem 26 includes an upsampler 28 and a low-pass filter 30. The upsampler 28 upsamples the baseband receive signal output by the RF component 24 from the first sampling rate to the second sampling rate by upsampling the baseband receive signal by a factor of N, where N=8 in this example. In this example, the upsampler 28 increases the sampling rate of the baseband receive signal from a 240 kHz sampling rate to a 1.92 MHz sampling rate. Specifically, the operation "↑8" produces a new signal where each sample of the original signal is followed by seven zeros. Then, the new signal is passed through the (ideal) low-pass filter 30 with gain 8 and cutoff ⅛ to thereby provide an upsampled baseband receive signal.

CP remover (i.e., a CP removal unit) 32: The signal at the input of the CP remover 32 has a 1.92 MHz sampling rate, matching the lowest sampling rate in legacy LTE design. Therefore, the CP remover 32 can remove the CP samples as in an LTE receiver. Specifically, with normal LTE CP, 10 samples of the first OFDM symbol are CP and removed, and nine samples of each of the remaining OFDM symbols in an LTE slot are CP and removed.

Downsampling Subsystem 34: A downsampling subsystem 34 operates to downsample the baseband receive signal output by the CP remover 32 from the second sampling rate (i.e., 1.92 MHz in this example) to the first sampling rate (i.e., 240 kHz in this example). The downsampling subsystem 34 includes a low-pass filter 36 and a downsampler 38. In this example, the downsampler 34 decreases the 1.92 MHz sampling rate back to about 240 kHz. Specifically, the signal at the output of CP remover 32 is first passed through the (ideal) low-pass filter 36 with gain 1 and cutoff ⅛. Then, the downsampler 38 downsamples the output signal of the low-pass filter 36 by the factor N, where N=8 in this example. The operation "↓8" produces a new signal by discarding seven out of every eight samples of the output signal of the low-pass filter 36. The output of the downsampling subsystem 34 is a baseband receive signal at the first sampling rate (i.e., 240 kHz in this example) that corresponds to the baseband receive signal output by the RF component 24 but with the CP portions removed.

Demodulation Subsystem: The baseband receive signal output by the downsampling subsystem 34 is demodulated by a demodulation subsystem. As a result of the lower sampling rate, the complexity of the demodulation subsystem is reduced as compared to that in a legacy LTE receiver. The demodulation subsystem includes, in this example, a 16-point FFT 40, a frequency domain equalizer 42, and a demodulator 43. The 16-point FFT 40 operates to perform a 16-point FFT on the baseband receive signal output by the downsampling subsystem 34 to thereby provide a transformed signal including frequency domain data symbols. With CP removed and changes of sampling rate, 16-point FFT operations can now be used to process each OFDM symbol that has 16 samples in the time domain, rather than 128-point or higher FFT operations. The frequency domain equalizer 42 is, in this example, a frequency domain equalizer such as that found in conventional OFDM receiver designs. In particular, in this example, the frequency domain equalizer 42 is a one-tap equalizer that equalizes the frequency domain data symbols. The demodulator 43 is, in this example, a conventional demodulator that outputs either soft bits or hard bits.

Note that, with extended LTE CP, the CP lengths of the OFDM symbols in an LTE slot are $32/1.92=16.67$ microseconds, i.e., four samples at the 240 kHz sampling rate. As a result, the four CP samples of each OFDM symbol can be directly removed at the downlink receiver without the need of changing the sampling rate. In other words, the upsampling subsystem 26 and the downsampling subsystem 34 can be by-passed when extended LTE CP is used such that the CP remover 32 removes the CP from the baseband receive signal output by the RF component 24 at the 240 kHz sampling rate.

FIG. 2B illustrates a downlink transmitter 44 (also referred to herein as a downlink transmit chain) according to some embodiments of the present disclosure. The downlink transmitter 44 is implemented in a radio access node 14 (e.g., an eNB), the cost of which is of less concern. Therefore, a high sampling rate and a larger FFT/IFFT size can be used. Nevertheless, FIG. 2B also shows that similar design can be used in the downlink transmitter 44 to enable a lower sampling rate and reduced FFT/IFFT operations in the radio access node 14 (e.g., an eNB). Essentially, the process of the downlink receiver 20 is reversed in the downlink transmitter 44.

Modulation Subsystem: A baseband transmit signal is received by the modulation subsystem. The baseband transmit signal is at a first sampling rate, which is this example is 240 kHz. As a result of the lower sampling rate, the complexity of the modulation subsystem is reduced as compared to that in a legacy LTE receiver. The modulation subsystem includes, in this example, a modulator 46, a subcarrier mapping function 48, and a 16-point IFFT 50. The modulator 46 is, in this example, a conventional modulator that receives a baseband transmit signal that includes input bits and outputs a modulated baseband transmit signal that includes modulated data symbols. The subcarrier mapping function 48 maps the modulated data symbols to the appropriate subcarriers, in the conventional manner. The 16-point IFFT 50 operates to perform a 16-point IFFT on the output of the subcarrier mapping function 48 to provide a transformed baseband transmit signal at the first sampling rate.

Upsampling Subsystem 52: An upsampling subsystem 52 operates to upsample the (transformed) baseband transmit signal from the modulation subsystem from the first sampling rate (i.e., 240 kHz in this example) to a second sampling rate (i.e., 1.92 MHz in this example). The upsampling subsystem 52 includes an upsampler 54 and a low-pass filter 56. The upsampler 54 upsamples the baseband transmit signal output by the modulation subsystem from the first sampling rate to the second sampling rate by upsampling the baseband transmit signal by a factor of N, where N=8 in this example. In this example, the upsampler 54 increases the sampling rate of the baseband transmit signal from a 240 kHz sampling rate to a 1.92 MHz sampling rate. Specifically, the operation "↑8" produces a new signal where each sample of the original signal is followed by seven zeros. Then, the new signal is passed through the (ideal) low-pass filter 56 with gain 8 and cutoff ⅛ to thereby provide an upsampled baseband transmit signal.

CP Adder (i.e., a CP unit) 58: The signal at the input of a CP adder 58 has a 1.92 MHz sampling rate, matching the lowest sampling rate in legacy LTE design. Therefore, the CP adder 58 can add the CP samples as in an LTE transmitter. Specifically, with normal LTE CP, 10 samples of the first OFDM symbol are a CP added by the CP adder 58 for the first OFDM symbol, and nine samples of each of the remaining OFDM symbols in an LTE slot are a CP added by the CP adder 58.

Downsampling Subsystem 60: A downsampling subsystem 60 operates to downsample the baseband transmit signal output by the CP adder 58 from the second sampling rate (i.e., 1.92 MHz in this example) to the first sampling rate (i.e., 240 kHz in this example). The downsampling subsystem 60 includes a low-pass filter 62 and a downsampler 64. Specifically, the signal at the output of the CP adder 58 is first passed through the (ideal) low-pass filter 62 with gain 1 and cutoff ⅛. Then, the downsampler 64 downsamples the output signal of the low-pass filter 62 by the factor N, where N=8 in this example. The operation "↓8" produces a new signal by discarding seven out of every eight samples of the output signal of the low-pass filter 62. The output of the downsampling subsystem 60 is a baseband transmit signal at the first sampling rate (i.e., 240 kHz in this example) that corresponds to the baseband transmit signal output by the modulation subsystem but with the CP portions added.

Receiver Front-End: The downlink transmitter 44 includes a RF front-end that includes, in this example, a pulse-shaping function 66, a RF component 68, and an antenna 70.

Figure 3A:
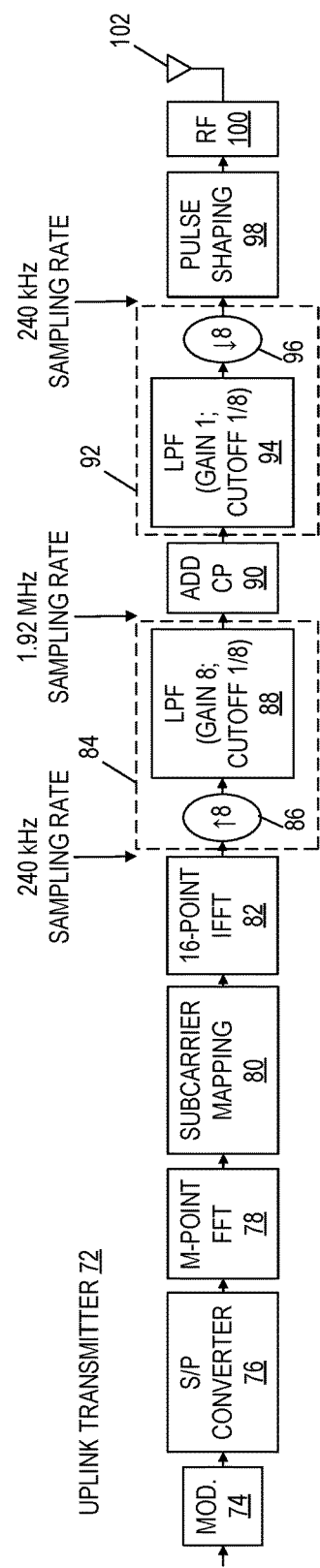
FIGS. 3A and 3B illustrate an uplink transmitter and an uplink receiver according to some embodiments of the present disclosure.
Figure 3B:
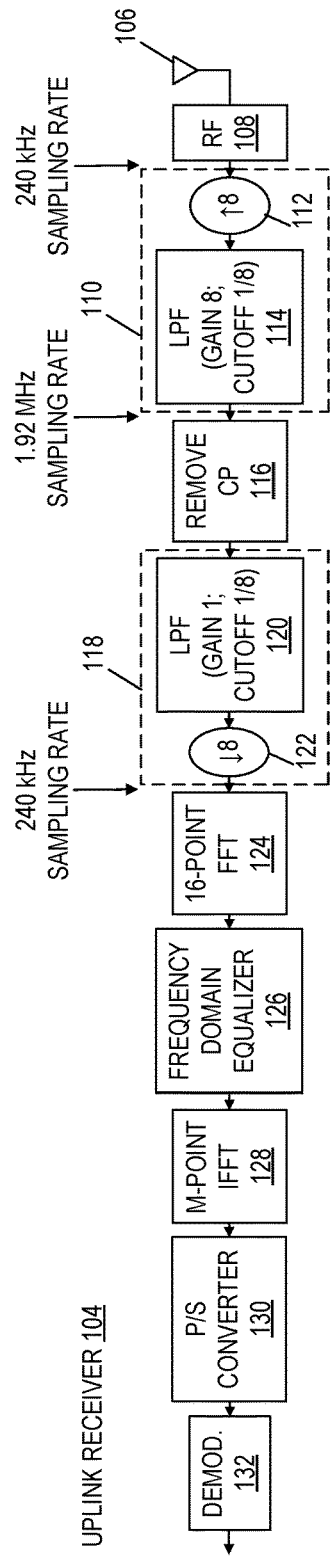

The uplink NB LTE transceiver architecture is shown in FIGS. 3A and 3B. FIG. 3A illustrates an uplink transmitter 72 according to some embodiments of the present disclosure. The uplink transmitter 72 is implemented in the wireless communication device 12 such as, for example, a MTC device, which is more sensitive to cost. Using NB LTE as an example, the useful bandwidth of NB LTE is 180 kHz even when it is deployed within a wide LTE carrier. Therefore, the RF component of a NB LTE transmitter is only required to generate a radio waveform sent on a 180 kHz channel (possibly with additional guard band). Therefore, it is sufficient to have a 180 kHz sampling rate in the baseband according to Nyquist sampling theorem. Because there are 12 subcarriers, each having 15 kHz bandwidth, an FFT/IFFT size of 16 is chosen to facilitate FFT processing while minimizing the computational complexity as much as possible. Consequently, the baseband sampling rate is 15 kHz*16=240 kHz at the input of the RF component of uplink receiver. Note that the wireless communication device 12 (e.g., MTC device) use a common 240 kHz sampling rate both for transmitting and receiving, which helps reduce cost and complexity.

The functional blocks of the uplink transmitter 72 are described as follows.

Modulation Subsystem: The uplink transmitter 72 includes a modulation subsystem that, in this example, includes a modulator 74, a Serial-to-Parallel (S/P) converter 76, an M-point FFT 78, a subcarrier mapping function 80, and a 16-point IFFT 82. The modulator 74 is, in this example, a conventional modulator as in any communication system. The modulator 74 maps bits in an input bit stream to constellation symbols (also referred to herein as data symbols). The S/P converter 76 formats input serial time-domain symbols into blocks, each of length M. The M-point FFT 78 converts each M parallel time-domain symbols to M frequency-domain symbols. The subcarrier mapping function 80 maps each M frequency-domain symbol to the specified subcarriers for transmission. The 16-point IFFT 82 converts the mapped symbols on the 16 subcarriers back to the time domain to thereby provide a baseband transmit signal at a first sampling rate, which is 240 kHz in this example.

Upsampling Subsystem 84: An upsampling subsystem 84 operates to upsample the baseband transmit signal output by the modulation subsystem from the first sampling rate (i.e., 240 kHz in this example) to a second sampling rate (i.e., 1.92 MHz in this example). The upsampling subsystem 84 includes an upsampler 86 and a low-pass filter 88. The upsampler 86 upsamples the baseband transmit signal output by the modulation subsystem from the first sampling rate to the second sampling rate by upsampling the baseband transmit signal by a factor of N, where N=8 in this example. In this example, the upsampler 86 increases the 240 kHz sampling rate to 1.92 MHz. Specifically, the operation "↑8" produces a new signal where each sample of the original signal is followed by seven zeros. Then, the new signal is passed through the (ideal) low-pass filter 88 with gain 8 and cutoff ⅛ to thereby provide an upsampled baseband transmit signal.

CP adder (i.e., a CP unit) 90: The signal at the input of a CP adder 90 has 1.92 MHz sampling rate, matching the lowest sampling rate in legacy LTE design. Therefore, the CP adder 90 can add the CP samples as in an LTE transmitter. Specifically, with normal LTE CP, 10 CP samples are added to the first OFDM symbol in an LTE slot, and nine CP samples are added to the remaining OFDM symbols in an LTE slot.

Downsampling Subsystem 92: A downsampling subsystem 92 operates to downsample the baseband transmit signal output by the CP adder 90 from the second sampling rate (i.e., 1.92 MHz in this example) to the first sampling rate (i.e., 240 kHz in this example). The downsampling subsystem 92 includes a low-pass filter 94 and a downsampler 96. In this example, the downsampler 96 decreases the 1.92 MHz sampling rate back to 240 kHz. Specifically, the signal at the output of the CP adder 90 is first passed through the (ideal) low-pass filter 94 with gain 1 and cutoff ⅛. Then, the downsampler 96 downsamples the output signal of the low-pass filter 94 by the factor N, where N=8 in this example. The operation "↓8" produces a new signal by discarding seven out of every eight samples of the output signal of the low-pass filter 94. The output of the downsampling subsystem 92 is a baseband transmit signal at the first sampling rate (i.e., 240 kHz in this example) that corresponds to the baseband transmit signal output by the modulation subsystem but with the CP portions added.

RF Front-End: The uplink transmitter 72 includes a RF front-end, which in this example includes a pulse shaping function 98, a RF component 100, and an antenna 102. The pulse shaping function 98 shapes the pulse of OFDM waveform and thus controls the spectral shape. The RF component 100 converts the digital signal to an analog signal and up-converts the analog signal to RF for transmission.

Note that if a MTC device is allocated only one subcarrier in the uplink, the Single Carrier Frequency Division Multiple Access (SC-FDMA) processing is not necessary, i.e., the functional blocks of the S/P converter 76 and the M-point FFT 78 can be skipped.

Note that, with extended LTE CP, the CP lengths of the OFDM symbols in an LTE slot are 32/1.92=16.67 microseconds, i.e., four samples in NB LTE with the designed 240 kHz sampling rate. As a result, the four CP samples of each OFDM symbol can be directly added at the uplink receiver without the need of changing sampling rate. In other words, the upsampling subsystem 84 and the downsampling subsystem 92 can be by-passed when extended LTE CP is used such that the CP adder 90 adds the CP to the baseband transmit signal output by the modulation subsystem at the 240 kHz sampling rate.

FIG. 3B illustrates an uplink receiver 104 according to some embodiments of the present disclosure. The uplink receiver 104 (also referred to herein as an uplink receive chain) is implemented in the radio access node 14 (e.g., an eNB), the cost of which is of less concern. Therefore, a high sampling rate and a larger FFT/IFFT size can be used. Nevertheless, FIG. 3B shows that similar design can be used in the uplink receive chain to enable a lower sampling rate and reduced FFT/IFFT operations in radio access nodes 14 (e.g., eNBs). The process of the uplink transmit chain is reversed in the uplink receive chain.

Receiver Front-End: The uplink receiver 104 includes a receiver front-end including an antenna 106 and a RF component 108. The useful bandwidth of NB LTE is 180 kHz even when it is deployed within a wide LTE carrier. Therefore, in the embodiment where the desired bandwidth is 180 kHz, the RF component 108 is only required to capture a radio signal sent on a 180 kHz channel. To capture this signal without any loss, it is sufficient to have a 180 kHz sampling rate in the baseband according to Nyquist sampling theorem. Because there are 12 subcarriers, each having 15 kHz bandwidth, an FFT/IFFT size of 16 is used to facilitate FFT processing while minimizing the computational complexity as much as possible. Consequently, the baseband sampling rate is 15 kHz*16=240 kHz at the output of RF component 108 of the uplink receiver 104. The remaining components of the uplink receiver 104 are described as follows.

Upsampling Subsystem 110: An upsampling subsystem 110 operates to upsample the baseband receive signal output by the RF component 108 from a first sampling rate (i.e., 240 kHz in this example) to a second sampling rate (i.e., 1.92 MHz in this example). The upsampling subsystem 110 includes an upsampler 112 and a low-pass filter 114. The upsampler 112 upsamples the baseband receive signal output by the RF component 108 from the first sampling rate to the second sampling rate by upsampling the baseband receive signal by a factor of N, where N=8 in this example. In this example, the upsampler 112 increases the sampling rate of the baseband receive signal from a 240 kHz sampling rate to a 1.92 MHz sampling rate. Specifically, the operation "↑8" produces a new signal where each sample of the original signal is followed by seven zeros. Then, the new signal is passed through the (ideal) low-pass filter 114 with gain 8 and cutoff ⅛ to thereby provide an upsampled baseband receive signal.

CP remover (i.e., a CP removal unit) 116: The signal at the input of a CP remover 116 has a 1.92 MHz sampling rate, matching the lowest sampling rate in legacy LTE design. Therefore, the CP remover 116 can remove the CP samples as in an LTE receiver. Specifically, with normal LTE CP, 10 samples of the first OFDM symbol are CP and removed, and nine samples of each of the remaining OFDM symbols in an LTE slot are CP and removed.

Downsampling Subsystem 118: A downsampling subsystem 118 operates to downsample the baseband receive signal output by the CP remover 116 from the second sampling rate (i.e., 1.92 MHz in this example) to the first sampling rate (i.e., 240 kHz in this example). The downsampling subsystem 118 includes a low-pass filter 120 and a downsampler 122. In this example, the downsampler 122 decreases the 1.92 MHz sampling rate back to about 240 kHz. Specifically, the signal at the output of CP remover 116 is first passed through the (ideal) low-pass filter 120 with gain 1 and cutoff ⅛. Then, the downsampler 122 downsamples the output signal of the low-pass filter 120 by the factor N, where N=8 in this example. The operation "↓8" produces a new signal by discarding seven out of every eight samples of the output signal of the low-pass filter 120. The output of the downsampling subsystem 118 is a baseband receive signal at the first sampling rate (i.e., 240 kHz in this example) that corresponds to the baseband receive signal output by the RF component 108 but with the CP portions removed.

Demodulation Subsystem: The baseband receive signal output by the downsampling subsystem 118 is demodulated by a demodulation subsystem. As a result of the lower sampling rate, the complexity of the demodulation subsystem is reduced as compared to that in a legacy LTE receiver. The demodulation subsystem includes, in this example, a 16-point FFT 124, a frequency domain equalizer 126, an M-point IFFT 128, a P/S converter 130, and a demodulator 132. The 16-point FFT 124 operates to perform a 16-point FFT on the baseband receive signal output by the downsampling subsystem 118 to thereby provide a transformed signal including frequency domain data symbols. With CP removed and changes of sampling rate, 16-point FFT operations can now be used to process each OFDM symbol that has 16 samples in the time domain, rather than 128-point or higher FFT operations. The frequency domain equalizer 126 is, in this example, a frequency domain equalizer such as that found in conventional OFDM receiver designs. In particular, in this example, the frequency domain equalizer 126 is a one-tap equalizer that equalizes the frequency domain data symbols. The M-point IFFT 128 converts each M frequency-domain data symbol into M parallel time-domain symbols. The P/S converter 130 converts the parallel time-domain symbols into a serial stream of time-domain symbols. The demodulator 132 is, in this example, a conventional demodulator that outputs either soft bits or hard bits.

Note that, with extended LTE CP, the CP lengths of the OFDM symbols in an LTE slot are 32/1.92=16.67 microseconds, i.e., four samples at the 240 kHz sampling rate. As a result, the four CP samples of each OFDM symbol can be directly removed at the uplink receiver 104 without the need of changing the sampling rate. In other words, the upsampling subsystem 110 and the downsampling subsystem 118 can be by-passed when extended LTE CP is used such that the CP remover 116 removes the CP from the baseband receive signal output by the RF component 108 at the 240 kHz sampling rate.

Figure 4:
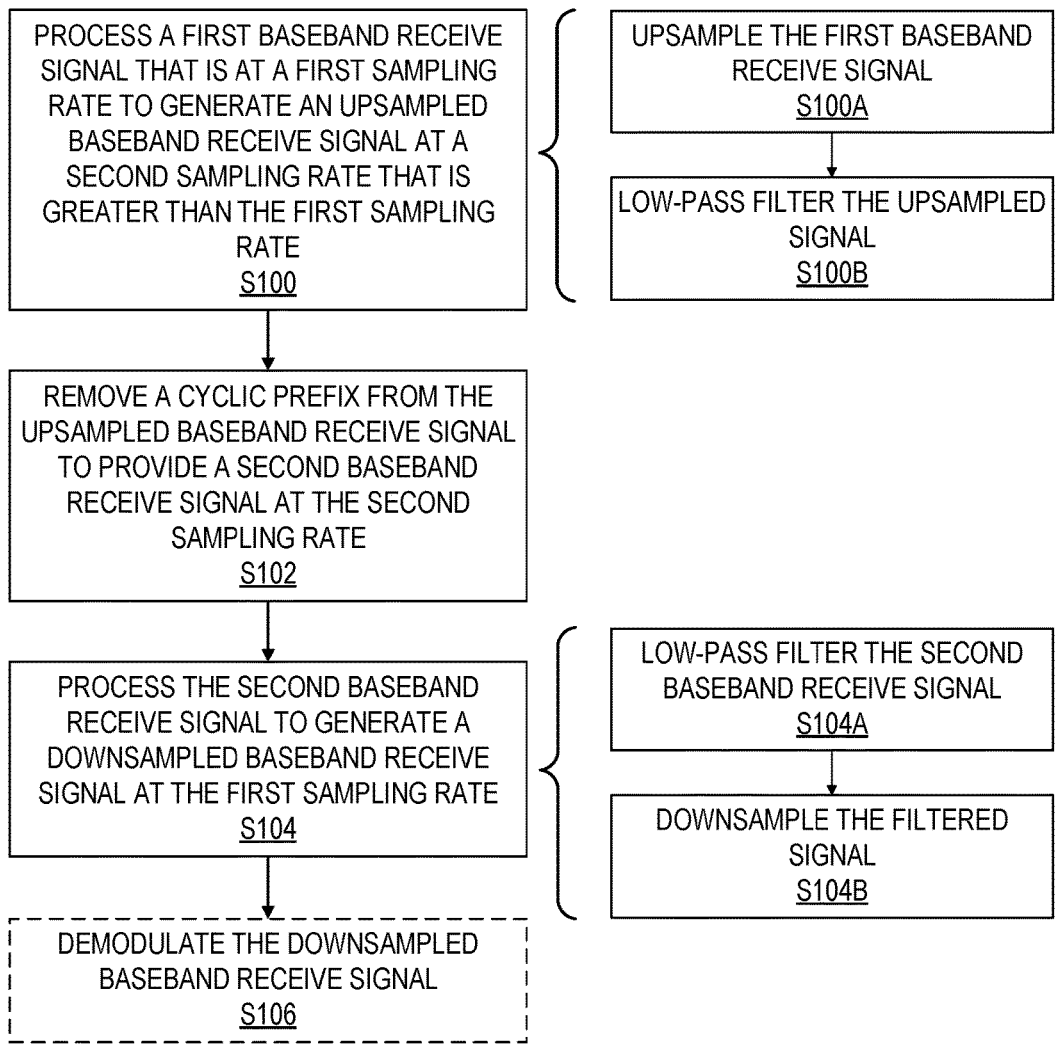
FIG. 4 is a flow chart that illustrates the operation of a node (e.g., a baseband processing node) of a receiver (e.g., the downlink receiver of FIG. 2A or the uplink receiver of FIG. 3B) according to some embodiments of the present disclosure.

FIG. 4 is a flow chart that illustrates the operation of a node (e.g., a baseband processing node) of a receiver (e.g., the downlink receiver 20 of FIG. 2A or the uplink receiver 104 of FIG. 3B) according to some embodiments of the present disclosure. The baseband processing node may be implemented in hardware or a combination of hardware and software (e.g., at least one processor executing software instructions). This process is the same as that describe above with respect to FIGS. 2A and 3B. As illustrated, the node processes a first baseband receive signal that is at a first sampling rate to generate an upsampled baseband receive signal at a second sampling rate, which is greater than the first sampling rate (S100). In particular, in some embodiments, the node upsamples the first baseband receive signal by a factor N to thereby provide an upsampled signal, where N is an integer greater than or equal to 2 (e.g., N=8) (S100A). The node low-pass filters the upsampled signal with a gain of N and a cut-off of 1/N to thereby provide the upsampled baseband receive signal (S100B).

The node then removes a CP from the upsampled baseband signal to provide a second baseband receive signal at the second sampling rate (S102). More specifically, the node removes a CP portion from the upsampled baseband signal for each symbol period. The node processes the upsampled baseband receive signal to generate a downsampled baseband receive signal at the first sampling rate (S104). In particular, in some embodiments, the node low-pass filters the second baseband receive signal with a gain of 1 and a cut-off of 1/N to thereby provide a filtered signal (S104A). The node downsamples the filtered signal by the factor N to thereby provide the downsampled baseband receive signal at the first sampling rate (S104B). Optionally, the node demodulates the downsampled baseband receive signal (S106), although this demodulation may be partially or completely performed by another node.

Figure 5:
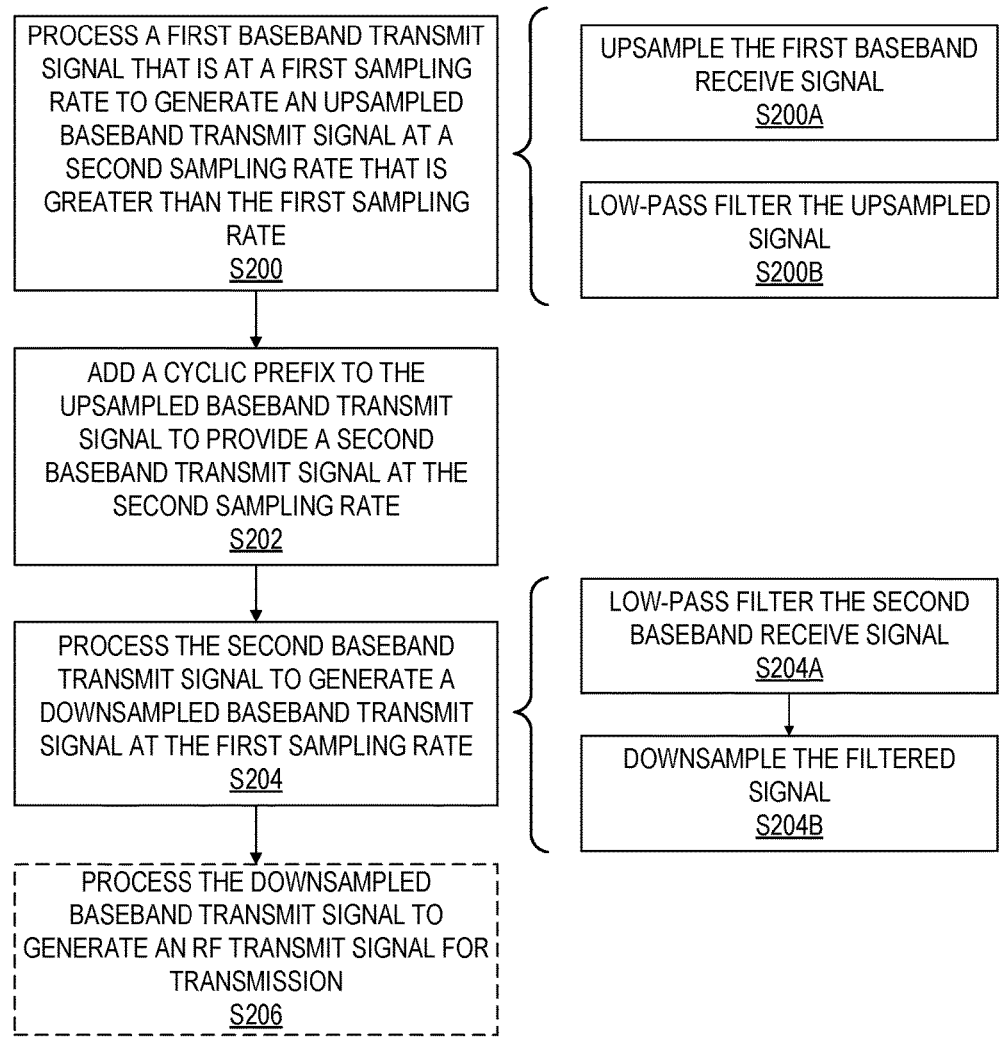
FIG. 5 is a flow chart that illustrates the operation of a node (e.g., a baseband processing node) of a transmitter (e.g., the downlink transmitter of FIG. 2B or the uplink transmitter of FIG. 3A) according to some embodiments of the present disclosure.

FIG. 5 is a flow chart that illustrates the operation of a node (e.g., a baseband processing node) of a transmitter (e.g., the downlink transmitter 44 of FIG. 2B or the uplink transmitter 72 of FIG. 3A) according to some embodiments of the present disclosure. The baseband processing node may be implemented in hardware or a combination of hardware and software (e.g., at least one processor executing software instructions). This process is the same as that described above with respect to FIGS. 2B and 3A. As illustrated, the node processes a first baseband transmit signal that is at a first sampling rate to generate an upsampled baseband transmit signal at a second sampling rate, which is greater than the first sampling rate (S200). In particular, in some embodiments, the node upsamples the first baseband transmit signal by a factor N to thereby provide an upsampled signal, where N is an integer greater than or equal to 2 (e.g., N=8) (S200A). The node low-pass filters the upsampled signal with a gain of N and a cut-off of 1/N to thereby provide the upsampled baseband transmit signal (S200B).

The node then adds a CP from the upsampled baseband signal to provide a second baseband transmit signal at the second sampling rate (S202). More specifically, the node adds a CP portion to the upsampled baseband signal for each symbol period. The node processes the upsampled baseband transmit signal to generate a downsampled baseband transmit signal at the first sampling rate (S204). In particular, in some embodiments, the node low-pass filters the second baseband transmit signal with a gain of 1 and a cut-off of 1/N to thereby provide a filtered signal (S204A). The node downsamples the filtered signal by the factor N to thereby provide the downsampled baseband transmit signal at the first sampling rate (S204B). Optionally, the node processes the downsampled baseband transit signal to generate a RF transmit signal for transmission (S206), although this processing may be partially or completely performed by another node.

As indicated by the foregoing, certain embodiments address the problems of high sampling rate and large number of FFT/IFFT operations associated with the existing NB LTE transceiver design for backward compatibility with legacy LTE. Compared to conventional approaches, certain embodiments of a NB LTE transceiver as described herein can achieve much lower sampling rate and requires much smaller number of FFT/IFFT operations, while keeping legacy LTE time-domain structure. Therefore, the proposed solution can help reduce NB LTE MTC device cost.

Figure 6:
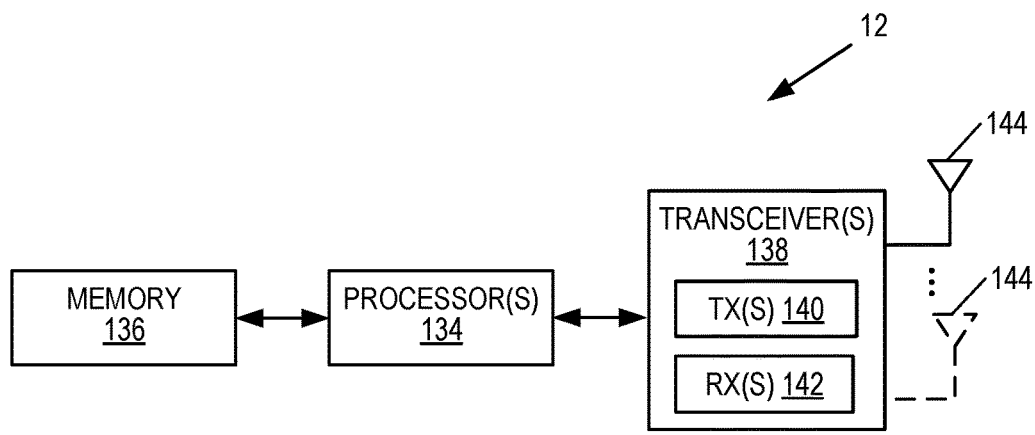
FIGS. 6 and 7 illustrate example embodiments of a wireless communication device.
Figure 7:
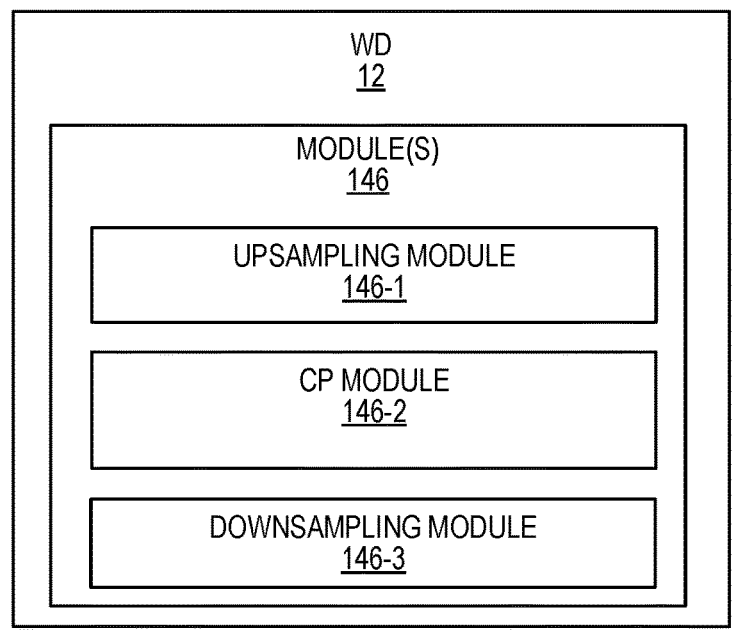

Although wireless communication devices 12 may represent communication devices that include any suitable combination of hardware and/or software, these wireless communication devices may, in certain embodiments, represent devices such as the example embodiments of the wireless communication device 12 illustrated in greater detail by FIGS. 6 and 7. Similarly, although the illustrated radio access node 14 may represent network nodes that include any suitable combination of hardware and/or software, these nodes may, in particular embodiments, represent devices such as the example embodiments of the radio access node 14 illustrated in greater detail by FIGS. 8 through 10.

Referring to FIG. 6, a wireless communication device 12 comprises a processor(s) 134 (e.g., Central Processing Unit(s) (CPU(s)), Application Specific Integrated Circuit(s) (ASIC(s)), Field Programmable Gate Array(s) (FPGA(s)), and/or the like), a memory 136, and a transceiver(s) 138 including a transmitter(s) 140 and a receiver(s) 142 coupled to an antenna(s) 144. In certain embodiments, some or all of the functionality described as being provided by UEs, MTC or M2M devices, and/or any other types of wireless communication devices may be provided by the device processor executing instructions stored on a computer-readable medium, such as the memory 136 shown in FIG. 6. Alternative embodiments may include additional components beyond those shown in FIG. 6 that may be responsible for providing certain aspects of the device's functionality, including any of the functionality described herein.

Notably, in some embodiments, the downlink receiver 20 is implemented in the receiver 142. In some other embodiments, the downlink receiver 20 may be partially implemented in the receiver 142 (e.g., the RF front-end of the downlink receiver 20 may be implemented in the receiver 142) and partially in the processor(s) 134, e.g. as circuitry and/or software executed by the processor 134 (e.g., the baseband processing including that of the upsampling subsystem 26, the CP remover 32, the downsampling subsystem 34, and the demodulation subsystem may be performed by the processor(s) 134). In a similar manner, in some embodiments, the uplink transmitter 72 is implemented in the transmitter 140. In some other embodiments, the uplink transmitter 72 may be partially implemented in the transmitter 140 (e.g., the RF front-end of the uplink transmitter 72 may be implemented in the transmitter 140) and partially in the processor(s) 134, e.g. as circuitry and/or software executed by the processor 134 (e.g., the baseband processing including that of the modulation subsystem, the upsampling subsystem 84, the CP adder 90, and the downsampling subsystem 92 may be performed by the processor(s) 134).

FIG. 7 illustrates the wireless communication device 12 according to some other embodiments of the present disclosure. In this embodiment, the wireless communication device 12 includes one or more modules 146, each of which is implemented in software. As illustrated, the one or more modules 146 include an upsampling module 146-1 that operates to upsample a baseband signal (i.e., a baseband transmit signal or a baseband receive signal depending on the embodiment), a CP module 146-2 that operates to either add or remove CPs depending on the embodiment, and a downsampling module 146-3 that operates to downsample the baseband signal after CP addition or removal, depending on the embodiment.

Figure 8:
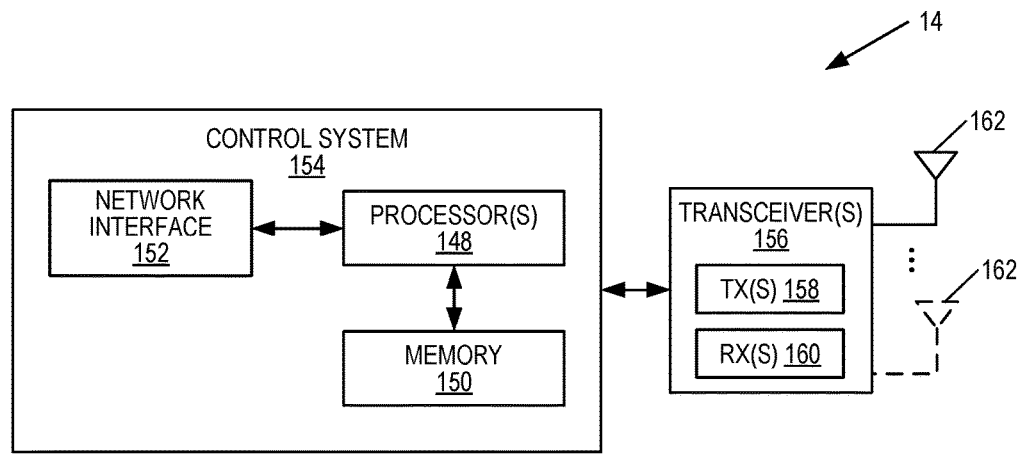
FIGS. 8 through 10 illustrate example embodiments of a radio access node.

Referring to FIG. 8, a radio access node 14 comprises a processor(s) 148 (e.g., CPU(s), ASIC(s), FPGA(s), and/or the like), a memory 150, a network interface 152, which in this example are implemented within a control system 154, and a transceiver(s) 156 including a transmitter(s) 158 and a receiver(s) 160 coupled to an antenna(s) 162. In certain embodiments, some or all of the functionality described as being provided by a base station, a node B, an eNB, and/or any other type of network node may be provided by the processor(s) 148 executing instructions stored on a computer-readable medium, such as the memory 150 shown in FIG. 8. Alternative embodiments of the radio access node 14 may comprise additional components to provide additional functionality, such as the functionality described herein and/or related supporting functionality.

Notably, in some embodiments, the uplink receiver 104 is implemented in the receiver 160. In some other embodiments, the uplink receiver 104 may be partially implemented in the receiver 160 (e.g., the RF front-end of the uplink receiver 104 may be implemented in the receiver 160) and partially in the processor(s) 148, e.g. as circuitry and/or software executed by the processor 148 (e.g., the baseband processing including that of the upsampling subsystem 110, the CP remover 116, the downsampling subsystem 118, and the demodulation subsystem may be performed by the processor(s) 148). In a similar manner, in some embodiments, the downlink transmitter 44 is implemented in the transmitter 158. In some other embodiments, the downlink transmitter 44 may be partially implemented in the transmitter 158 (e.g., the RF front-end of the downlink transmitter 44 may be implemented in the transmitter 158) and partially in the processor(s) 148, e.g. as circuitry and/or software executed by the processor 148 (e.g., the baseband processing including that of the modulation subsystem, the upsampling subsystem 52, the CP adder 58, and the downsampling subsystem 60 may be performed by the processor(s) 148).

Figure 9:
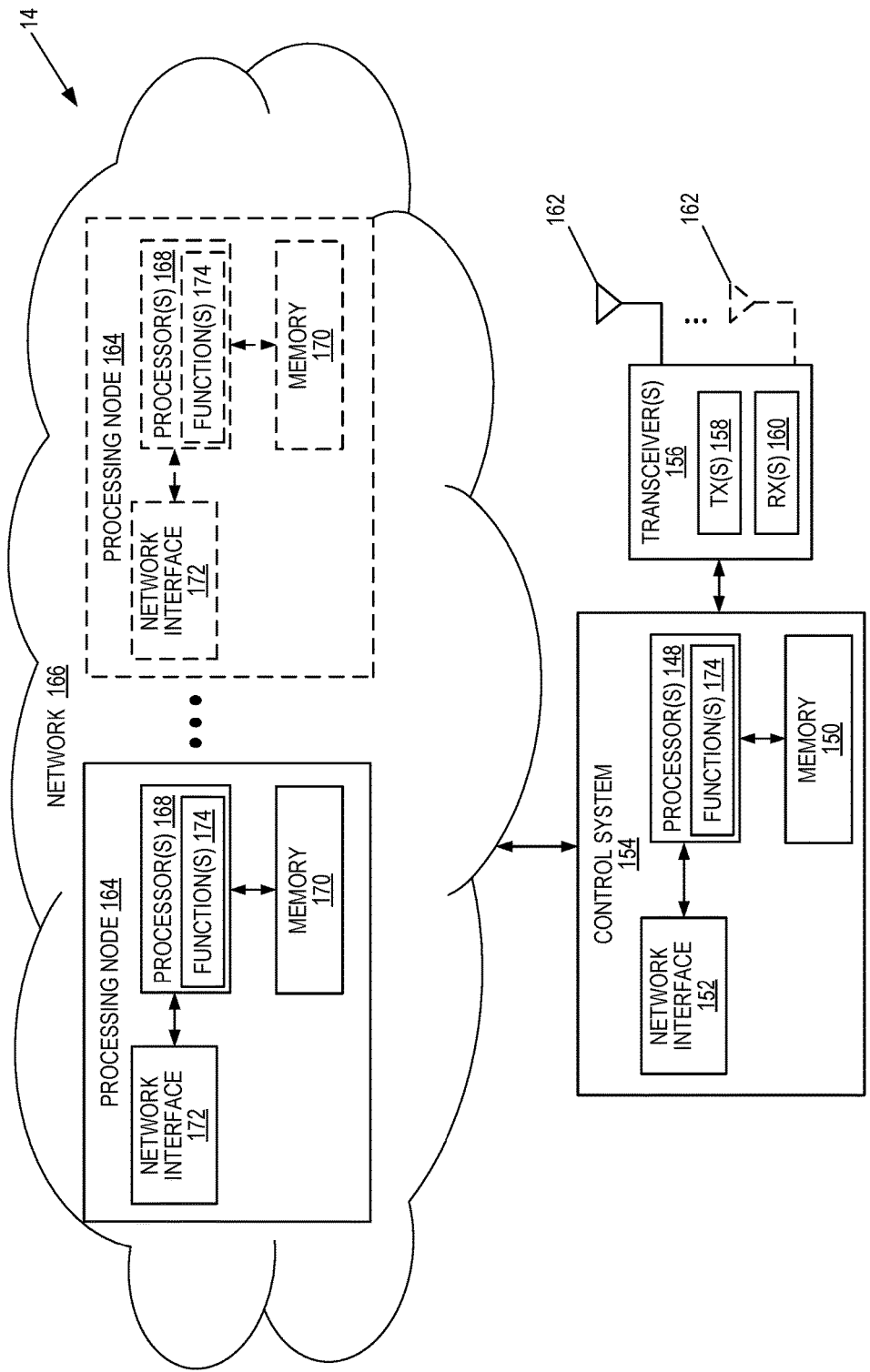

FIG. 9 is a schematic block diagram that illustrates a virtualized embodiment of the radio access node 14 according to some embodiments of the present disclosure. As used herein, a "virtualized" radio access node 14 is an implementation of the radio access node 14 in which at least a portion of the functionality of the radio access node 14 is implemented as a virtual component(s) (e.g., via a virtual machine(s) executing on a physical processing node(s) in a network(s)). As illustrated, in this example, the radio access node 14 includes the control system 154 that includes the one or more processors 148 (e.g., CPUs, ASICs, FPGAs, and/or the like), the memory 150, and the network interface 152 and the one or more transceivers 156 that each includes the one or more transmitters 158 and the one or more receivers 160 coupled to the one or more antennas 162, as described above. The control system 154 is connected to the transceiver(s) 156 via, for example, an optical cable or the like. The control system 154 is connected to one or more processing nodes 164 coupled to or included as part of a network(s) 166 via the network interface 152. Each processing node 164 includes one or more processors 168 (e.g., CPUs, ASICs, FPGAs, and/or the like), memory 170, and a network interface 172.

In this example, functions 174 of the radio access node 14 described herein are implemented at the one or more processing nodes 164 or distributed across the control system 154 and the one or more processing nodes 164 in any desired manner. In some particular embodiments, some or all of the functions 174 of the radio access node 14 described herein are implemented as virtual components executed by one or more virtual machines implemented in a virtual environment(s) hosted by the processing node(s) 164. As will be appreciated by one of ordinary skill in the art, additional signaling or communication between the processing node(s) 164 and the control system 154 is used in order to carry out at least some of the desired functions 174. Notably, in some embodiments, the control system 154 may not be included, in which case the transceiver(s) 156 communicate directly with the processing node(s) 164 via an appropriate network interface(s).

Notably, in some embodiments, the uplink receiver 104 is implemented in the receiver 160. In some other embodiments, the uplink receiver 104 may be partially implemented in the receiver 160 (e.g., the RF front-end of the uplink receiver 104 may be implemented in the receiver 160) and partially in the processor(s) 148 in the control system 154 and/or the processor(s) 168 in one or more of the radio access nodes 14, e.g. as circuitry and/or software executed by the processor(s) (e.g., the baseband processing including that of the upsampling subsystem 110, the CP remover 116, the downsampling subsystem 118, and the demodulation subsystem may be performed by the processor(s) 148 and/or the processor(s) 168). In a similar manner, in some embodiments, the downlink transmitter 44 is implemented in the transmitter 158. In some other embodiments, the downlink transmitter 44 may be partially implemented in the transmitter 158 (e.g., the RF front-end of the downlink transmitter 44 may be implemented in the transmitter 158) and partially in the processor(s) 148 in the control system 154 and/or the processor(s) 168 in one or more of the radio access nodes 14, e.g. as circuitry and/or software executed by the processor(s) (e.g., the baseband processing including that of the modulation subsystem, the upsampling subsystem 52, the CP adder 58, and the downsampling subsystem 60 may be performed by the processor(s) 148 and/or the processor(s) 168).

Figure 10:
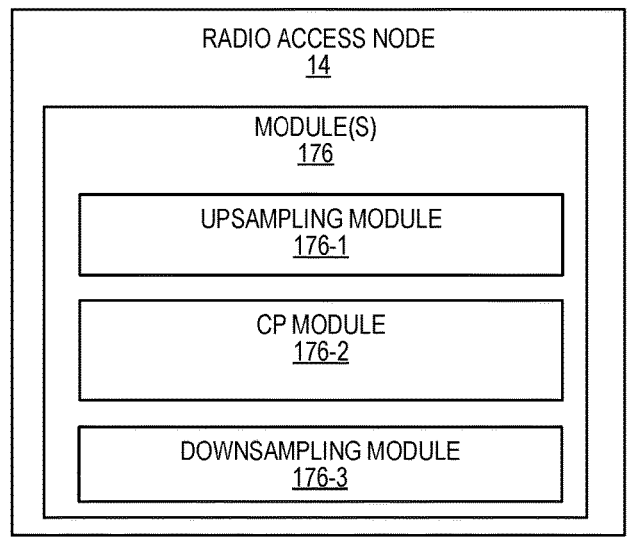

FIG. 10 illustrates the radio access node 14 according to some other embodiments of the present disclosure. In this embodiment, the radio access node 14 includes one or more modules 176, each of which is implemented in software. As illustrated, the one or more modules 176 include an upsampling module 176-1 that operates to upsample a baseband signal (i.e., a baseband transmit signal or a baseband receive signal depending on the embodiment), a CP module 176-2 that operates to either add or remove CPs depending on the embodiment, and a downsampling module 176-3 that operates to downsample the baseband signal after CP addition or removal, depending on the embodiment.

The following acronyms are used throughout this disclosure.

2G Second Generation
3G Third Generation
3GPP Third Generation Partnership Project
4G Fourth Generation
ASIC Application Specific Integrated Circuit
CIoT Cellular Internet of Things
CP Cyclic Prefix
CPU Central Processing Unit
EDGE Enhanced Data Rates for GSM Evolution
eNB Enhanced or Evolved Node B
FFT Fast Fourier Transform
FPGA Field Programmable Gate Array
GERAN GSM EDGE Radio Access Network
GSM Global System for Mobile Communications
IFFT Inverse Fast Fourier Transform
IoT Internet of Things
kHz Kilohertz
LTE Long Term Evolution
M2M Machine to Machine
MHz Megahertz
MTC Machine Type Communication
NB Narrowband
OFDM Orthogonal Frequency Division Multiplexing
OFDMA Orthogonal Frequency Division Multiple Access
PRB Physical Resource Block
RAN Radio Access Network
RF Radio Frequency
SC-FDMA Single Carrier Frequency Division Multiple Access
S/P Serial-to-Parallel
TSG Technical Specification Group
UE User Equipment Those skilled in the art will recognize improvements and modifications to the embodiments of the present disclosure. All such improvements and modifications are considered within the scope of the concepts disclosed herein and the claims that follow.

What is claimed is:

1. A system for a receiver, comprising:
   an upsampling subsystem operable to process a first baseband receive signal that is at a first sampling rate to generate an upsampled baseband receive signal at a second sampling rate that is greater than the first sampling rate;
   a cycle prefix removal unit operable to remove a cyclic prefix from the upsampled baseband receive signal to provide a second baseband receive signal at the second sampling rate; and
   a downsampling subsystem operable to process the second baseband receive signal to generate a downsampled baseband receive signal at the first sampling rate.

2. The system of claim 1 wherein a duration of the cyclic prefix is equivalent to a non-integer number of samples at the first sampling rate.

3. The system of claim 1 wherein the upsampling subsystem comprises:
   an upsampler adapted to upsample the first baseband receive signal by a factor N to thereby provide an upsampler output signal, where N is an integer greater than or equal to 2; and
   a low-pass filter adapted to filter the upsampler output signal with a gain of N and a cut-off of 1/N to thereby provide the upsampled baseband receive signal.

4. The system of claim 1 wherein the downsampling subsystem comprises:
   a low-pass filter adapted to filter the second baseband receive signal with a gain of 1 and a cut-off of 1/N to thereby provide a filter output signal; and
   a downsampler adapted to downsample the filter output signal by the factor N to thereby provide the downsampled baseband receive signal at the first sampling rate.

5. The system of claim 1 further comprising a multi-subcarrier demodulation subsystem comprising:
   a transform unit operable to perform a Fourier transform on the downsampled baseband receive signal to provide a transformed baseband receive signal.

6. The system of claim 5 wherein the Fourier transform is a 16-point Fast Fourier Transform, FFT.

7. The system of claim 6 wherein a subcarrier spacing between subcarriers is 15 kilohertz, kHz, the first sampling rate is 240 kHz, and the second sampling rate is 1.92 megahertz, MHz.

8. The system of claim 7 wherein a duration of the cyclic prefix is 5.1 microseconds for a first symbol in a slot and 4.7 microseconds for remaining symbols in the slot.

9. The system of claim 1 wherein the receiver is a receiver for a narrowband radio node that operates according to a narrowband technology that reuses a legacy Long Term Evolution, LTE, frame and Orthogonal Frequency Division Multiplexing, OFDM, symbol structure.

10. The system of claim 9 wherein the narrowband technology uses a 180 kHz bandwidth.

11. The system of claim 1 wherein the receiver is a receiver for a cellular communications network and the receiver is a narrowband radio node that operates within a narrowband portion of a system bandwidth of the cellular communications network.

12. The system of claim 11 wherein the system bandwidth is greater than or equal to 1.4 MHz, and the narrowband portion of the system bandwidth is a 180 kHz portion of the system bandwidth.

13. A method of operation of a system for a receiver, comprising:
processing a first baseband receive signal that is at a first sampling rate to generate an upsampled baseband receive signal at a second sampling rate that is greater than the first sampling rate;
removing a cyclic prefix from the upsampled baseband receive signal to provide a second baseband receive signal at the second sampling rate; and
processing the second baseband receive signal to generate a downsampled baseband receive signal at the first sampling rate.

14. The method of claim 13 wherein a duration of the cyclic prefix is equivalent to a non-integer number of samples at the first sampling rate.

15. The method of claim 13 wherein processing the first baseband receive signal that is at the first sampling rate to generate the upsampled baseband receive signal at the second sampling rate comprises:
upsampling the first baseband receive signal by a factor N to thereby provide an upsampled signal, where N is an integer greater than or equal to 2; and
low-pass filtering the upsampled signal with a gain of N and a cut-off of 1/N to thereby provide the upsampled baseband receive signal.

16. The method of claim 13 wherein processing the second baseband receive signal to generate the downsampled baseband receive signal at the first sampling rate comprises:
low-pass filtering the second baseband receive signal with a gain of 1 and a cut-off of 1/N to thereby provide a filtered signal; and
downsampling the filtered signal by the factor N to thereby provide the downsampled baseband receive signal at the first sampling rate.

17. The method of claim 13 further comprising demodulating the downsampled baseband receive signal, wherein demodulating the downsampled baseband receive signal comprises performing a Fourier transform on the downsampled baseband receive signal to provide a transformed baseband receive signal.

18. The method of claim 17 wherein the Fourier transform is a 16-point Fast Fourier Transform, FFT.

19. The method of claim 18 wherein a subcarrier spacing between subcarriers is 15 kilohertz, kHz, the first sampling rate is 240 kHz, and the second sampling rate is 1.92 megahertz, MHz.

20. The method of claim 19 wherein a duration of the cyclic prefix is 5.1 microseconds for a first symbol in a slot and 4.7 microseconds for remaining symbols in the slot.

21. The method of claim 13 wherein the receiver is a receiver for a narrowband radio node that operates according to a narrowband technology that reuses a legacy Long Term Evolution, LTE, frame and Orthogonal Frequency Division Multiplexing, OFDM, symbol structure.

22. The method of claim 21 wherein the narrowband technology uses a 180 kHz bandwidth.

23. The method of claim 13 wherein the receiver is a receiver for a cellular communications network and the receiver is a narrowband radio node that operates within a narrowband portion of a system bandwidth of the cellular communications network.

24. The method of claim 23 wherein the system bandwidth is greater than or equal to 1.4 MHz, and the narrowband portion of the system bandwidth is a 180 kHz portion of the system bandwidth.

25. A system for a transmitter, comprising:
an upsampling subsystem operable to process a first baseband transmit signal that is at a first sampling rate to generate an upsampled baseband transmit signal at a second sampling rate that is greater than the first sampling rate;
a cyclic prefix unit operable to add a cyclic prefix to the upsampled baseband transmit signal to provide a second baseband transmit signal at the second sampling rate; and
a downsampling subsystem operable to process the second baseband transmit signal to generate a downsampled baseband transmit signal at the first sampling rate.

26. The system of claim 25 wherein a duration of the cyclic prefix is equivalent to a non-integer number of samples at the first sampling rate.

27. The system of claim 25 wherein the upsampling subsystem comprises:
an upsampler adapted to upsample the first baseband transmit signal by a factor N to thereby provide an upsampler output signal, where N is an integer greater than or equal to 2; and
a low-pass filter adapted to filter the upsampler output signal with a gain of N and a cut-off of 1/N to thereby provide the upsampled baseband transmit signal.

28. The system of claim 25 wherein the downsampling subsystem comprises:
a low-pass filter adapted to filter the second baseband transmit signal with a gain of 1 and a cut-off of 1/N to thereby provide a filter output signal; and
a downsampler adapted to downsample the filter output signal by the factor N to thereby provide the downsampled baseband transmit signal at the first sampling rate.

29. The system of claim 25 further comprising a multi-subcarrier modulation subsystem comprising:
a transform unit operable to perform an inverse Fourier transform on an input signal to provide the first baseband transmit signal.

30. The system of claim 29 wherein the inverse Fourier transform is a 16-point Inverse Fast Fourier Transform, IFFT.

31. The system of claim 30 wherein a subcarrier spacing between subcarriers is 15 kilohertz, kHz, the first sampling rate is 240 kHz, and the second sampling rate is 1.92 megahertz, MHz.

32. The system of claim 31 wherein a duration of the cyclic prefix is 5.1 microseconds for a first symbol in a slot and 4.7 microseconds for remaining symbols in the slot.

33. The system of claim 25 wherein the transmitter is a transmitter for a narrowband radio node that operates according to a narrowband technology that reuses a legacy Long Term Evolution, LTE, frame and Orthogonal Frequency Division Multiplexing, OFDM, symbol structure.

34. The system of claim 33 wherein the narrowband technology uses a 180 kHz bandwidth.

35. The system of claim 25 wherein the transmitter is a transmitter for a cellular communications network and the transmitter is a narrowband radio node that operates within a narrowband portion of a system bandwidth of the cellular communications network.

36. The system of claim 35 wherein the system bandwidth is greater than or equal to 1.4 MHz, and the narrowband portion of the system bandwidth is a 180 kHz portion of the system bandwidth.

37. A method of operation of a system for a transmitter, comprising:
processing a first baseband transmit signal that is at a first sampling rate to generate an upsampled baseband transmit signal at a second sampling rate that is greater than the first sampling rate;
adding a cyclic prefix to the upsampled baseband transmit signal to provide a second baseband transmit signal at the second sampling rate; and
processing the second baseband transmit signal to generate a downsampled baseband transmit signal at the first sampling rate.

38. The method of claim 37 wherein a duration of the cyclic prefix is equivalent to a non-integer number of samples at the first sampling rate.

39. The method of claim 37 wherein processing the first baseband transmit signal that is at the first sampling rate to generate the upsampled baseband transmit signal at the second sampling rate comprises:
upsampling the first baseband transmit signal by a factor N to thereby provide an upsampled signal, where N is an integer greater than or equal to 2; and
low-pass filtering the upsampled signal with a gain of N and a cut-off of 1/N to thereby provide the upsampled baseband transmit signal.

40. The method of claim 37 wherein processing the second baseband transmit signal to generate the downsampled baseband transmit signal at the first sampling rate comprises:
low-pass filtering the second baseband transmit signal with a gain of 1 and a cut-off of 1/N to thereby provide a filtered signal; and
downsampling the filtered signal by the factor N to thereby provide the downsampled baseband transmit signal at the first sampling rate.

41. The method of claim 37 further comprising performing an inverse Fourier transform on an input signal to provide the first baseband transmit signal.

42. The method of claim 41 wherein the inverse Fourier transform is a 16-point Inverse Fast Fourier Transform, IFFT.

43. The method of claim 42 wherein a subcarrier spacing between subcarriers is 15 kilohertz, kHz, the first sampling rate is 240 kHz, and the second sampling rate is 1.92 megahertz, MHz.

44. The method of claim 43 wherein a duration of the cyclic prefix is 5.1 microseconds for a first symbol in a slot and 4.7 microseconds for remaining symbols in the slot.

45. The method of claim 37 wherein the transmitter is a transmitter for a narrowband radio node that operates according to a narrowband technology that reuses a legacy Long Term Evolution, LTE, frame and Orthogonal Frequency Division Multiplexing, OFDM, symbol structure.

46. The method of claim 45 wherein the narrowband technology uses a 180 kHz bandwidth.

47. The method of claim 37 wherein the transmitter is a transmitter for a cellular communications network and the transmitter is a narrowband radio node that operates within a narrowband portion of a system bandwidth of the cellular communications network.

48. The method of claim 47 wherein the system bandwidth is greater than or equal to 1.4 MHz, and the narrowband portion of the system bandwidth is a 180 kHz portion of the system bandwidth.

* * * * *